US012393608B1

(12) United States Patent
Ma

(10) Patent No.: US 12,393,608 B1
(45) Date of Patent: Aug. 19, 2025

(54) METASTORE MANAGER FOR MULTI-PLATFORM DATA OPERATIONS

(71) Applicant: Zoom Communications, Inc., San Jose, CA (US)

(72) Inventor: Jiyue Ma, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/673,931

(22) Filed: May 24, 2024

(51) Int. Cl.
G06F 7/00 (2006.01)
G06F 16/242 (2019.01)
G06F 16/27 (2019.01)

(52) U.S. Cl.
CPC ........ G06F 16/278 (2019.01); G06F 16/2433 (2019.01)

(58) Field of Classification Search
CPC .. G06F 16/278; G06F 16/2433; G06F 16/258; G06F 16/119; G06F 21/604; G06F 16/219; G06F 21/6245; G06F 21/6227
USPC .... 707/602, 689, 713, 737, 769, 802, 999.1, 707/17.005, 610, 624, 694, 770, 999.101; 711/100, 113, 154, 162
See application file for complete search history.

(56) References Cited

U.S. PATENT DOCUMENTS

| | | |
|---|---|---|
| 8,200,613 B1 | 6/2012 | Wan et al. |
| 10,102,269 B2 | 10/2018 | Marin |
| 10,120,904 B2 | 11/2018 | Ranganathan |
| 10,541,938 B1 | 1/2020 | Timmerman et al. |
| 11,074,107 B1 | 7/2021 | Nandakumar |
| 11,107,177 B1* | 8/2021 | Ashley ...................... G06T 1/20 |
| 11,153,173 B1 | 10/2021 | Rebeja |
| 11,741,119 B2 | 8/2023 | Orun |
| 11,941,014 B1* | 3/2024 | Das ........................ G06F 16/219 |
| 2011/0282835 A1* | 11/2011 | Cannon .................. G06F 16/119 |
| | | 707/622 |
| 2018/0196867 A1 | 7/2018 | Wiesmaier et al. |
| 2020/0257596 A1* | 8/2020 | Gokhale .................. G06F 16/25 |
| 2021/0124739 A1 | 4/2021 | Karanasos et al. |
| 2021/0294814 A1 | 9/2021 | Murthy |
| 2022/0138004 A1 | 5/2022 | Nandakumar |
| 2024/0427911 A1* | 12/2024 | Apostolatos .......... G06F 16/258 |

* cited by examiner

Primary Examiner — Md I Uddin
(74) Attorney, Agent, or Firm — Young Basile Hanlon & MacFarlane, P.C.

(57) ABSTRACT

A metastore manager facilitates access to data/metadata stored on at least one data management platform. A first data processing operation is initiated, in association with a data set maintained in a first data store associated with a first data management platform, to generate a first processed data set. The first processed data set is stored in the first data store and a first metadata set corresponding to the first processed data set is stored in a first metastore associated with the first data store. The first metadata set includes partition metadata indicative of partitioning information associated with the first processed data set. A synchronization operation is implemented to store, in a second metastore associated with a second data management platform, a second metadata set corresponding to a subset of the first metadata set. The metastore manager may facilitate access, by a data processing pipeline, to the processed data set.

15 Claims, 10 Drawing Sheets

METASTORE MANAGER FOR MULTI-PLATFORM DATA OPERATIONS

FIELD

This disclosure generally relates to data management and, more specifically, to metastore managers for multi-platform data operations.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
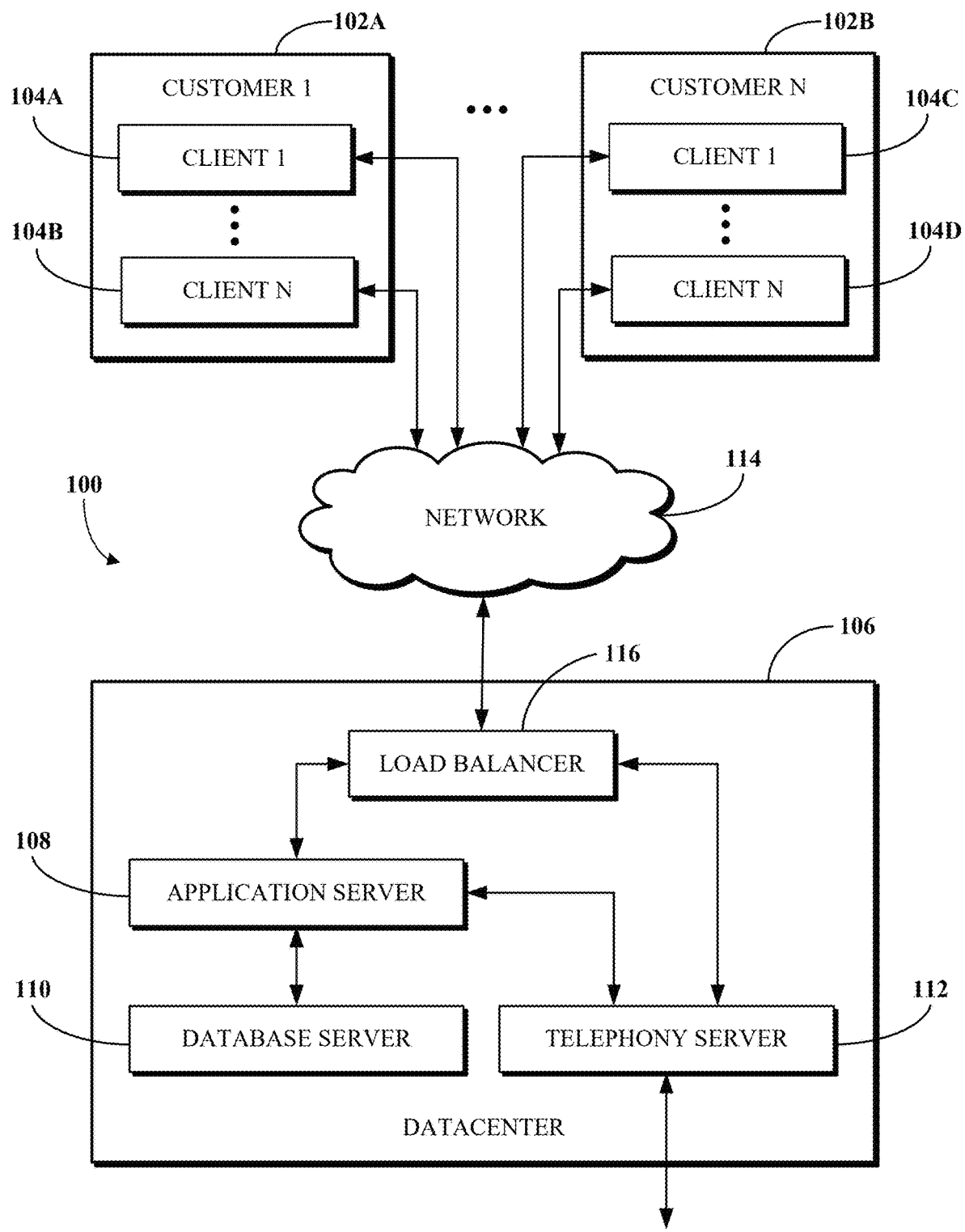
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

To support conferencing services, a UCaaS platform may be implemented in connection with one or more databases configured to maintain data. Data may include, for example, customer data (e.g., data provided by, about, or otherwise associated with one or more customers), communication data (e.g., data associated with prior conferences, networks, devices, and/or other aspects of implementations of the UCaaS platform. Any number of different data management platforms may be used for ingesting, processing, storing, and/or otherwise managing data. For example, cloud services may be used for data management. In some implementations, several different data management platforms may be utilized. In some cases, a data processing operation may be configured to be executed on one platform in connection with data that is stored in another platform. In some cases, modifying data in one platform may require modifying related data stored on another platform. Because the different data management platforms may be provided by different entities and/or services, the different data management platforms may not be structured similarly. As a result, establishing dependencies between data management platforms to facilitate this sort of cross-platform management can be challenging and result in data loss and/or corruption.

Implementations of this disclosure address problems such as these by providing a metastore manager in association with at least one data management platform. The metastore manager may be configured to facilitate access to data and/or metadata stored on one or more data management platforms. The access to the data may be access by users and/or by other platforms. For example, the metastore manager may facilitate access, by a first data management platform, to data and/or metadata stored on a second data management platform. In some cases, the metastore manager may facilitate access, by a data processing pipeline, to data stored on one or more of the data management platform. In this way, aspects of the disclosure may facilitate cross-platform data management operations, enabling independent platforms to exchange data.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for multi-platform data operations. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
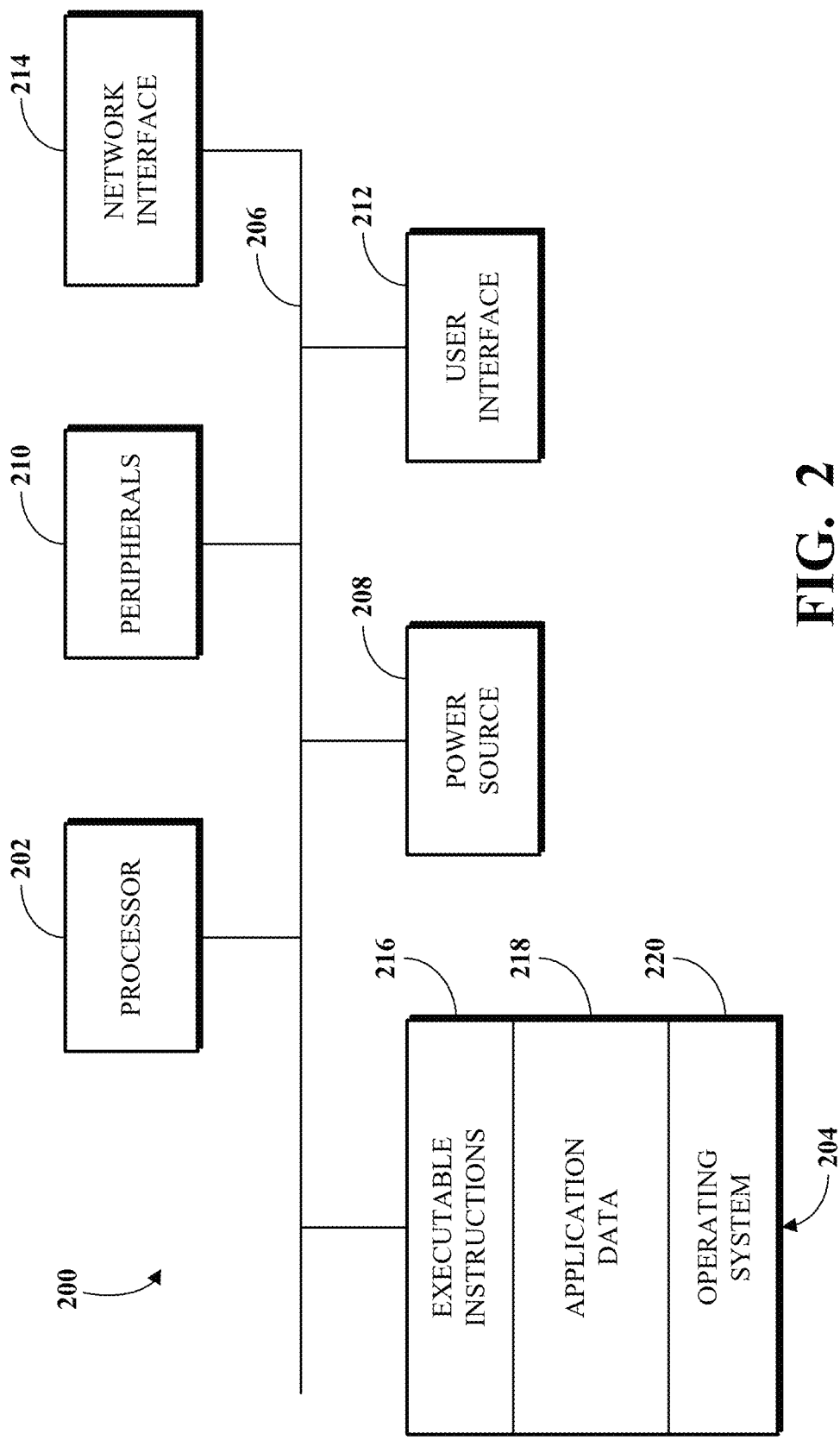
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
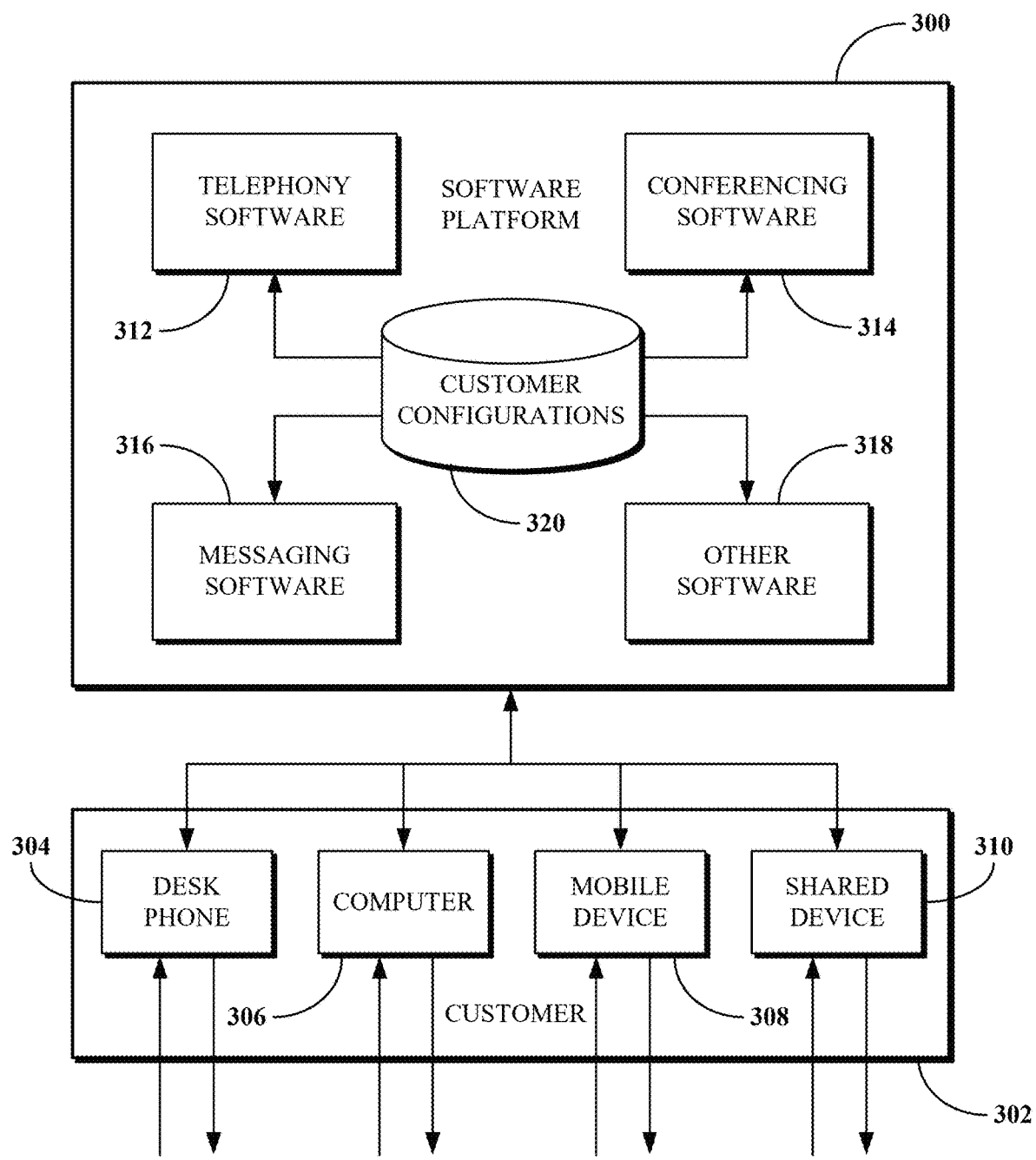
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a metastore manager, as described herein.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Data used, generated, and/or otherwise interacted with by the software platform may be ingested, stored, and/or processed using an RDBMS. SQL is a programming language used for managing and manipulating relational databases. SQL enables users to interact with databases by defining, querying, and manipulating data stored in tables. SQL is widely used in the field of database management and is supported by most RDBMSs. Some features of SQL include the following. (1) Data Querying: SQL allows users to retrieve specific data from a database using the SELECT statement. Queries can involve filtering, sorting, grouping, and aggregating data. (2) Data Manipulation: SQL provides statements like INSERT, UPDATE, and DELETE for modifying data stored in tables. (3) Data Definition: SQL supports statements like CREATE, ALTER, and DROP for defining and modifying the structure of a database schema, including tables, indexes, views, and constraints. (4) Data Control: SQL includes commands for managing access to the database, such as GRANT and REVOKE, which control privileges like SELECT, INSERT, UPDATE, DELETE, and others.

Before SQL queries are executed by an execution engine, the corresponding SQL code must be compiled. The terms "compiling" or "compiler" in the context of SQL can encompass all or most of the preprocessing steps that may be necessary prior to execution of SQL code, including the following. (1) Parsing: Parsing involves analyzing the syntactic structure of SQL code to create an abstract representation, typically a parse tree or AST. (2) Validation: Validation ensures that the parsed SQL code conforms to the semantic rules and constraints of the underlying data model, checking elements such as table and column existence and data types. (3) Compilation: Compilation translates the optimized SQL code into a logical plan, which outlines the sequence of operations needed to fulfill the specified operations on the database.

After compilation, an execution engine transforms a logical plan into an execution plan (sometimes called a physical execution plan). The execution plan outlines the detailed steps and operations that the execution engine will perform to execute the computation(s) described by the logical plan. It considers factors such as data partitioning, task scheduling, and resource allocation to efficiently execute the computation(s) across a cluster of computational devices. The execution engine may perform the following key functions. (1) Task Scheduling: The execution engine breaks down the execution plan into smaller tasks and schedules these tasks to run on the available resources within a computer cluster. The execution engine ensures that these tasks are scheduled efficiently across the cluster. (2) Distributed Processing: The execution engine coordinates the distributed processing of data across the nodes, or computers, of the computer cluster. It manages data partitioning, data shuffling, and data movement between nodes to ensure that the computation is performed in parallel and efficiently utilizes the available resources. (3) Fault Tolerance: The execution engine incorporates fault tolerance mechanisms to handle failures gracefully. It monitors the execution of tasks and tracks the lineage of Resilient Distributed Datasets (RDDs) or DataFrames to enable recomputation of lost or corrupted data partitions in case of node failures. (4) Data Caching and Persistence: The execution engine supports caching and persistence of intermediate data to optimize performance. It enables users to specify which data should be cached in memory or persisted to disk, reducing the need for recomputation and improving overall query performance. (4) Integration with Storage Systems: The execution engine interacts with storage systems like Hadoop Distributed File System (HDFS), Amazon Simple Storage Service (S3), or other cloud storage solutions to read input data and write output data generated during query execution. Overall, the execution engine plays a central role in orchestrating the distributed execution of SQL queries and other computations, ensuring efficient resource utilization, fault tolerance, and high-performance data processing on large-scale datasets.

Two common distributed computing systems, or platforms, for compiling and executing SQL code are Apache Spark and Apache Flink. Apache Spark is an open-source distributed computing system that provides an interface for programming entire clusters with implicit data parallelism and fault tolerance. Spark's core abstraction is the RDD, a distributed collection of objects. Spark offers several higher-level libraries built on top of its core, including Spark SQL, which provides support for executing SQL queries (i.e., SQL code) and working with structured data using DataFrame application programming interface (API) or SQL queries. With Spark SQL, users can write SQL queries to process large volumes of data efficiently in parallel across a cluster. Apache Flink is another open-source distributed computing system, which operates according to a data-stream processing framework that provides data distribution, communication, and fault tolerance for distributed computations. Flink's core abstraction is the DataStream API for processing unbounded streams of data and the DataSet API for batch processing. Flink also offers support for SQL queries through Flink SQL, which allows users to write SQL queries to process both streaming and batch data. Flink's SQL support includes a rich set of built-in functions, windowing capabilities, and support for complex event processing (CEP). Although the example implementations described herein focus on Apache Spark, utilization of other distributed computing systems, such as Apache Flink, is within the scope of this disclosure.

In Spark, for example, a logical plan and/or an execution plan, that results from compiled SQL code, can be represented by DAG at execution time. A DAG is essentially a graph of the computational dependencies between different RDDs or DataFrames resulting from transformations in the SQL code. Each vertex in the DAG represents an operation or transformation, and the edges represent the flow of data between these operations. Both vertices and edges can represent operations in Spark, which are referred to herein as "operational vertices" and "operational edges," respectively. Traditionally, the DAG produced by Spark is local rather than global. A local DAG represents only a portion of the logical plan and/or execution plan, whereas a global DAG represents an entire logical plan and/or execution plan that results from the compiled SQL code. Spark's DAG is local because Spark constructs the DAG dynamically (e.g., incrementally) just prior to execution of a next stage of the logical plan based on the sequence of transformations and actions invoked by the SQL code. Each RDD or DataFrame transformation adds to the existing DAG, and actions trigger the execution of the DAG up to that point.

Figure 4:
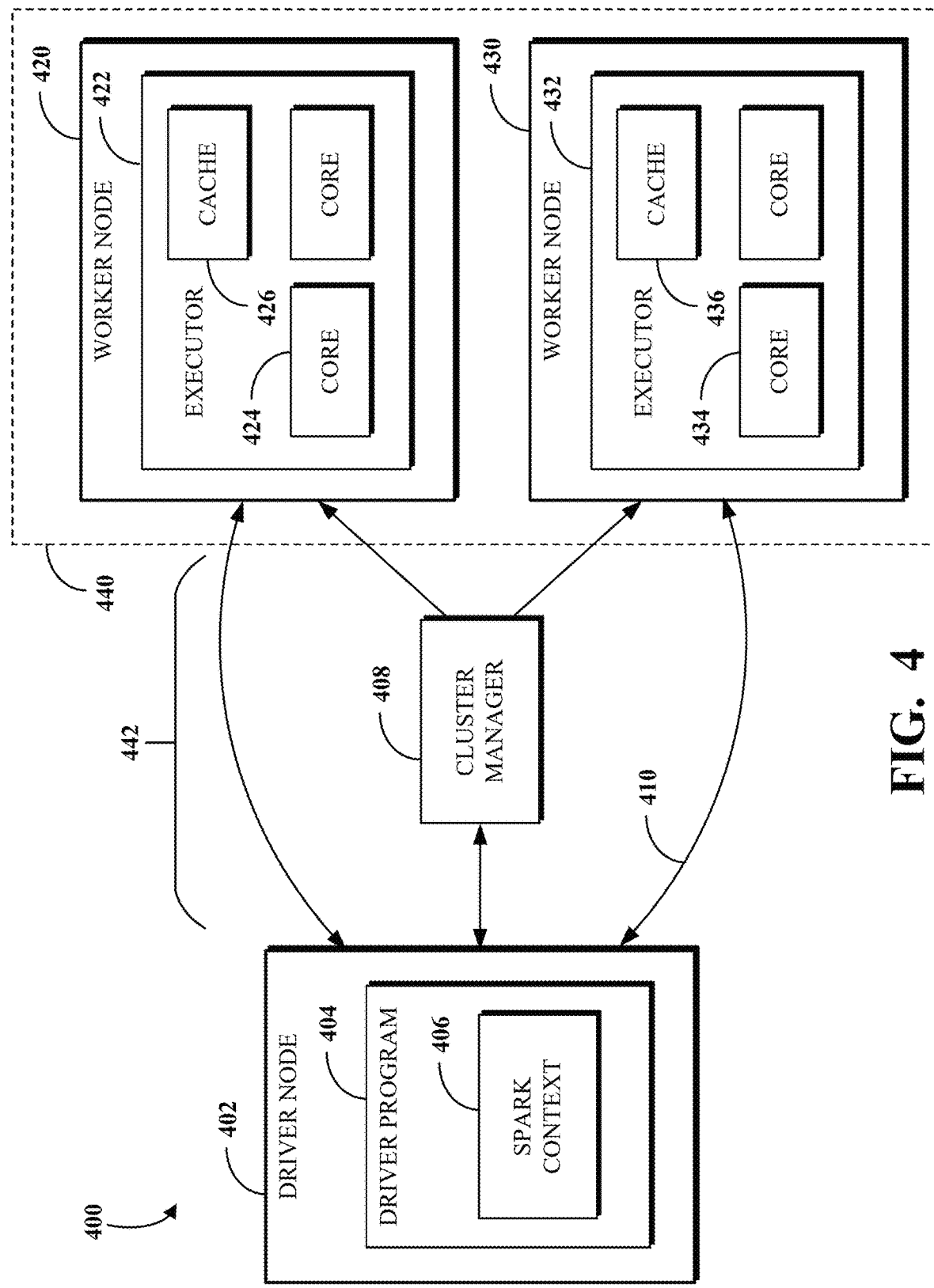
FIG. 4 is a block diagram of an example of a Spark execution system for executing structured query language (SQL) queries.

FIG. 4 is a block diagram of an example of a Spark execution system 400 for executing SQL queries. The Spark execution system 400 comprises a driver node 402, a cluster 440, and a cluster manager 408. The cluster 440 comprises one or more cluster nodes, which in this example, are illustrated as a worker node 420 and a worker node 430. The driver node 402 and the cluster manager 408 are communicatively coupled to each other and to the worker node 420 and the worker node 430, via one or more connections 410 of a network 442. The network 442 can be or include, for example, the Internet, a local area network (LAN), a wide area network (WAN), a virtual private network (VPN), or another public or private means of electronic computer communication capable of transferring data between computational devices. In some implementations, a computational device can connect to the network 442 via a communal connection point, link, or path, or using a distinct connection point, link, or path. For example, a connection point, link, or path can be wired (e.g., electrical or optical), wireless (e.g., electromagnetic or optical), use other communications technologies, or a combination thereof.

The driver node 402 serves as the central orchestrator of the Spark execution system 400, comprising a driver program 404 that includes Spark context 406. The driver program initiates and coordinates the execution of Spark applications, including the processing of SQL queries. The driver program 404 interfaces with the Spark context 406 to establish communication with the worker nodes 420 and 430, to initialize the execution environment, and to oversee task distribution and resource allocation. The cluster manager 408 is responsible for managing and coordinating the worker nodes 420 and 430 within the cluster 440.

Each worker node 420 and 430 comprises an executor 422 and 432, respectfully, which is responsible for executing tasks delegated by the driver node 402. In some implementations, each executor 422 and 432 is a processor, such as a microprocessor. The executors 422 and 432 implement respective caches 426 and 436, for efficient data storage and retrieval during computation. Furthermore, each executor 422 and 432 implement one or more respective cores 424 and 434, which are responsible for carrying out specific computations as part of an SQL query execution process.

Figure 5:
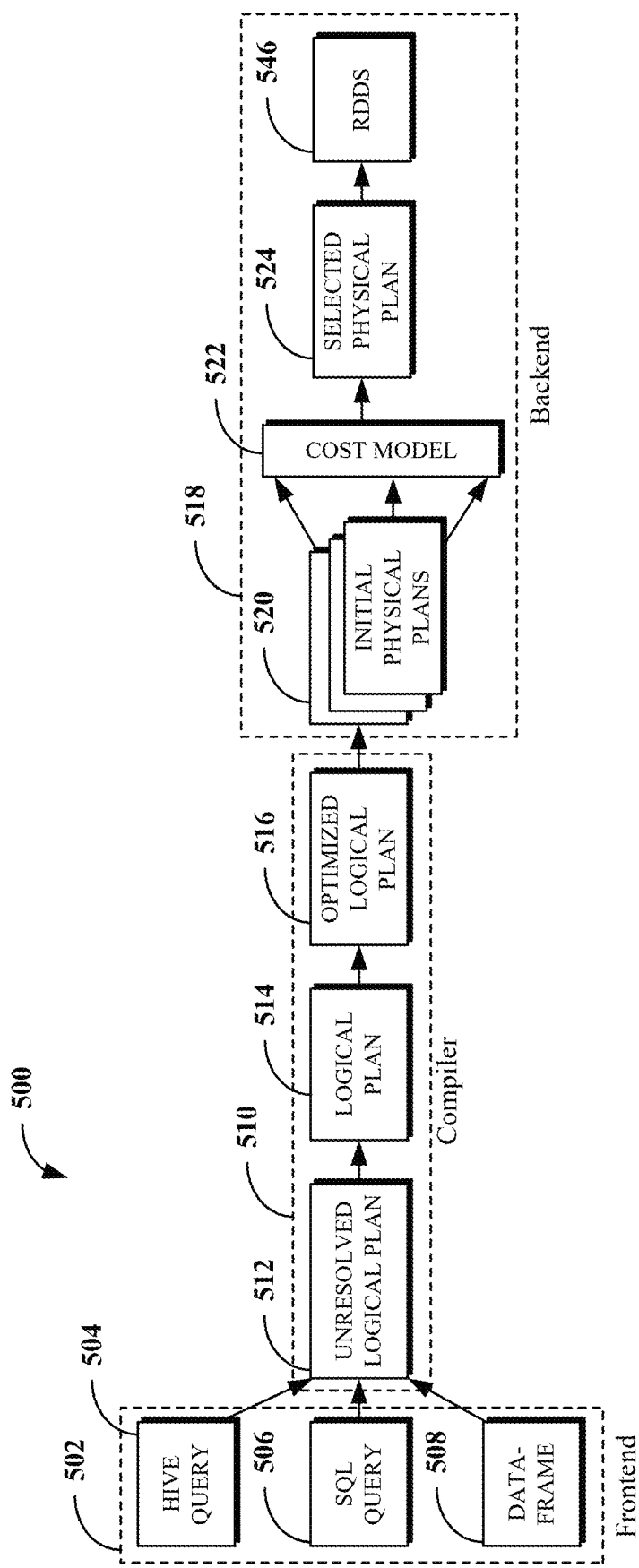
FIG. 5 is an example of a Spark optimization framework for translating one or more SQL queries of SQL code into executable operations on a database.

FIG. 5 is an example of a Spark optimization framework 500 for translating one or more SQL queries 506 of SQL code into executable operations on a database. The framework 500 can be partitioned into a frontend 502, a compiler 510, and a backend 518. The frontend 502 serves as the entry point for users to provide the SQL query 506, as well as other instruction formats such as a Hive query 504 and a DataFrame 508. The frontend 502 is responsible for accepting the various input formats and passing them to the compiler 510 for further processing.

The compiler 510 is the primary component responsible for translating SQL query 506 (and/or other inputs) into an optimized logical plan 516. The compiler 510 processes the SQL query 506 in several stages. The first stage yields an unresolved logical plan 512, which represents the initial representation of the SQL query 506 without any optimization applied. The second stage yields a logical plan 514, which is a refinement of the unresolved logical plan 512 based on resolving dependencies and applying standard optimization techniques. The third stage yields an optimized logical plan 516, which is a further refinement of the logical plan 514 based on advanced optimization strategies to further enhance query performance and efficiency. The unresolved logical plan 512, the logical plan 514, and/or the optimized logical plan 516 may each be represented by a local DAG, i.e., a DAG representing the SQL query 506 which is a part of more comprehensive SQL code or an SQL job.

Once the compiler 510 generates the optimized logical plan 516, it passes the optimized logical plan 516 to the backend 518 for execution. The backend 518 comprises several stages that yield, respectively, one or more initial physical plans 520, a selected physical plan 524, and RDDs 546. The initial physical plans 520 represent the actual execution plans generated from the optimized logical plan 516 according to various resource allocations. The cost model 522 evaluates the cost associated with the different initial physical plans 520, considering factors such as data distribution, resource utilization, and execution time. Based on the analysis of the cost model 522, the backend 518 selects the most efficient of the initial physical plans 520, referred to as the selected physical plan 524. Finally, the backend 518 translates the selected physical plan 524 into RDDs for distributed data processing, which enables parallel execution of SQL queries across multiple nodes in a cluster, such as the worker node 420 and the worker node 430 in the cluster 440 of FIG. 4. The distributed execution of SQL queries enhances scalability and performance, particularly for handling large volumes of data.

Figure 6:
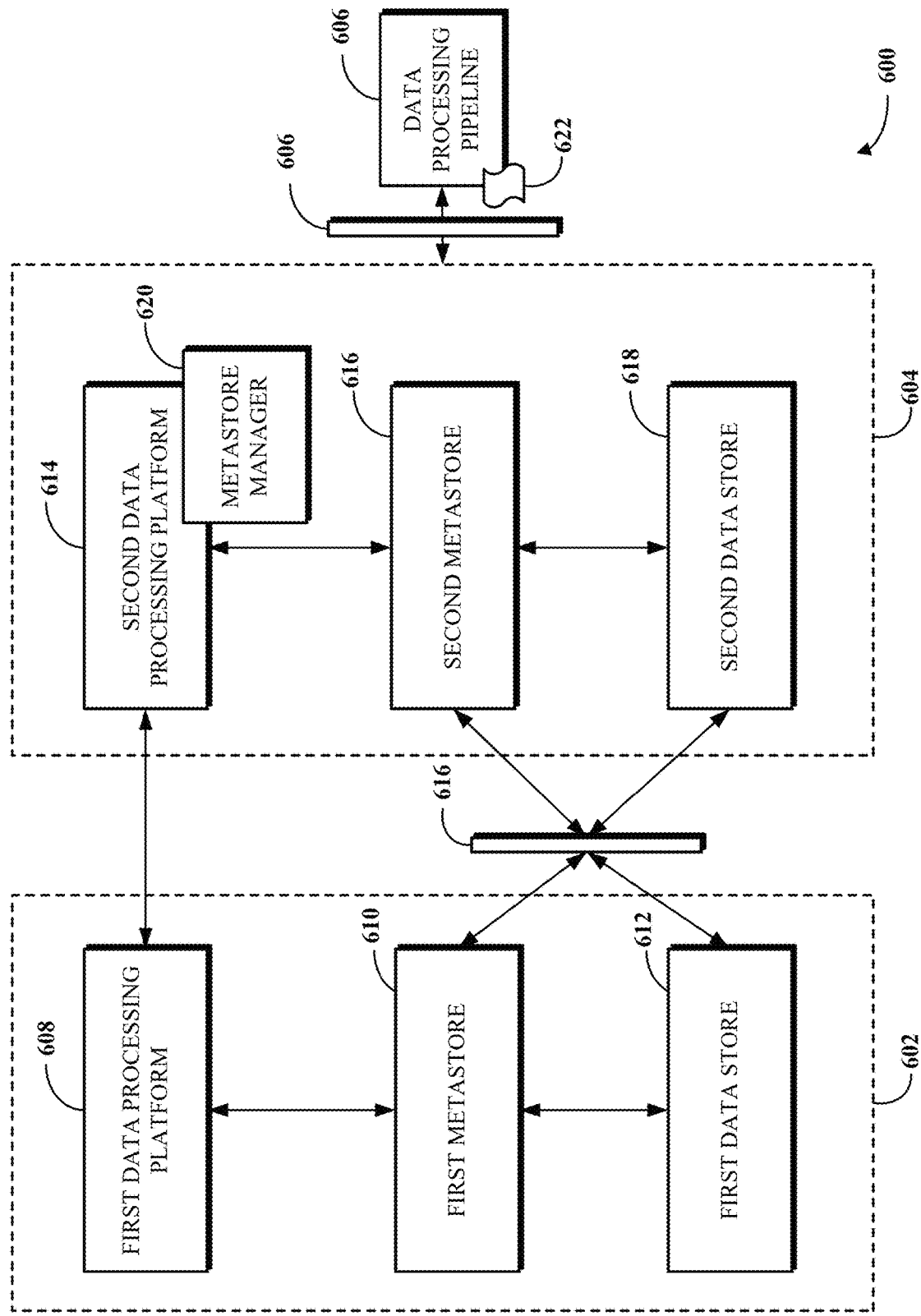
FIG. 6 is a diagram illustrating an example of a data management environment.

FIG. 6 is a diagram illustrating an example of a data management environment 600. The data management environment 600 includes a first data management platform 602, a second data management platform 604, and a data processing pipeline 606. The first data management platform 602 includes a first data processing platform 608, a first metastore 610 associated with the first data processing platform 608, and a first data store associated with the first data processing platform 608. Similarly, the second data management platform 604 includes a second data processing platform 614, a second metastore 616 associated with the second data processing platform 614, and a second data store 618 associated with the second data processing platform 614. The first metastore 610 maintains metadata associated with data stored in the first data store 612. The second metastore 616 maintains metadata associated with data stored in the second data store 618. A metastore manager 620 associated with the second data management platform 604 may be configured to manage interactions between the first data management platform 602 and the second data management platform 604. The metastore manager 620 also may be configured to manage interactions between the second data management platform 604 and the data processing pipeline 606. A refresh component 622 is maintained on the data processing pipeline 606 to facilitate access, by the data processing pipeline 606, to data stored in the first data store 612.

Figure 7:
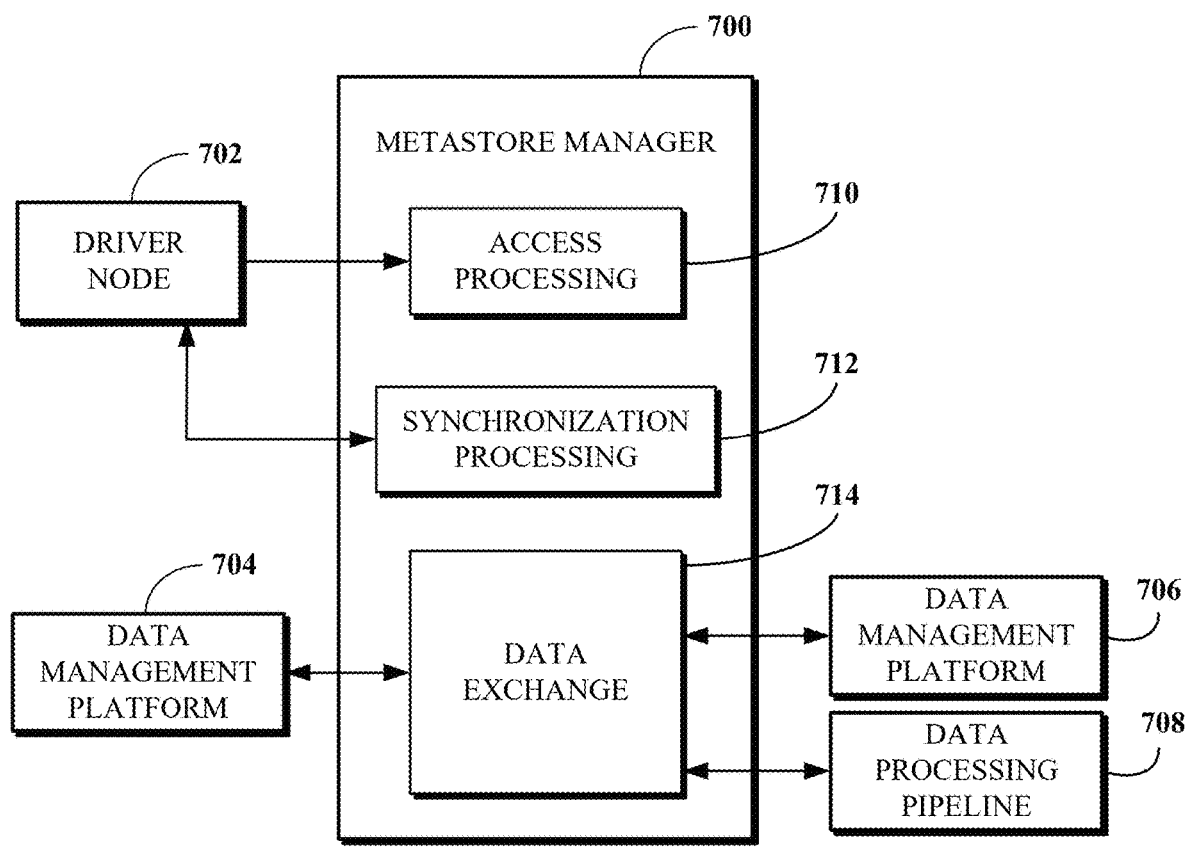
FIG. 7 is a block diagram of an example of a metastore manager system.

FIG. 7 is a block diagram of an example of a metastore manager system. A metastore manager 700, which in some cases may be implemented in connection with a software platform (e.g., the software platform 300 shown in FIG. 3), is accessed by a driver node 702 (e.g., the driver node 402 shown in FIG. 4) and used to facilitate interactions between data management platforms. The metastore manager 700 may be implemented using one or more servers and software running thereon. For example, the metastore manager 700 may be implemented using one or more of the servers 108 through 112 shown in FIG. 1 and may use communication software such as or similar to the software 312 through 318 shown in FIG. 3. In some examples, the metastore manager 700 may be implemented using the driver node 702 and/or one or more worker nodes (e.g., the worker node 420 and/or the worker node 430 shown in FIG. 4). The metastore manager 700 may include, or be included in, a conferencing system and/or the contact center. The metastore manager 700 may be, be similar to, include, or be included in, the computing device 200 shown in FIG. 2. The metastore manager 700 includes software for facilitating exchange of data between two or more of a data management platform 704, a data management platform 706, and a data processing pipeline 708. As shown, the software includes access processing software 710, synchronization processing software 712, and data exchange software 714.

The access processing software 710 facilitates access to a data store and/or a metastore to obtain data for a data processing operation. For example, the driver node 702 may forward a request and/or a function call to the access processing software 710 to facilitate obtaining data from a data management platform 704 or 706. The driver node 702 may be associated one or more of the data management platforms 704 or 706. The access processing software 710 may determine and otherwise manage permissions, roles, and/or other data access attributes, initiate a synchronization operation (e.g., by causing an activation of the synchronization processing software 712), and/or provide access to the requested and/or called data.

The synchronization processing software 712 may facilitate synchronization operations between two or more of the data management platforms 704 or 706. For example, in some cases, the synchronization processing software 712 may be configured to facilitate periodic synchronization operations and/or on-demand synchronization operations. A periodic synchronization operation may be a synchronization operation that is facilitated according to a schedule that may be maintained by the metastore manager 700. An on-demand synchronization operation may be a synchronization operation that is facilitated in response to a request or function call received by the access processing software 710.

The data exchange software 714 may facilitate the transfer of data from one data management platform to another data management platform. The data exchange software 714 may include any number of different security components, query engines, data transformation components, and/or other components configured to facilitate providing data stored in one data management platform to another data management platform.

Although the access processing software 710, synchronization processing software 712, and data exchange software 714 are shown as separate software components, in some implementations, some or all of the access processing software 710, synchronization processing software 712, and data exchange software 714 may be combined. For example, the metastore manager 700 may be or include a single software component which performs the functionality of all of the access processing software 710, synchronization processing software 712, and data exchange software 714. In some implementations, one or more of the access processing software 710, synchronization processing software 712, and data exchange software 714 may be comprised of multiple software components. In some implementations, the metastore manager 700 may include software components other than the access processing software 710, synchronization processing software 712, and data exchange software 714, such as in addition to or in place of one or more of the access processing software 710, synchronization processing software 712, and data exchange software 714.

Figure 8:
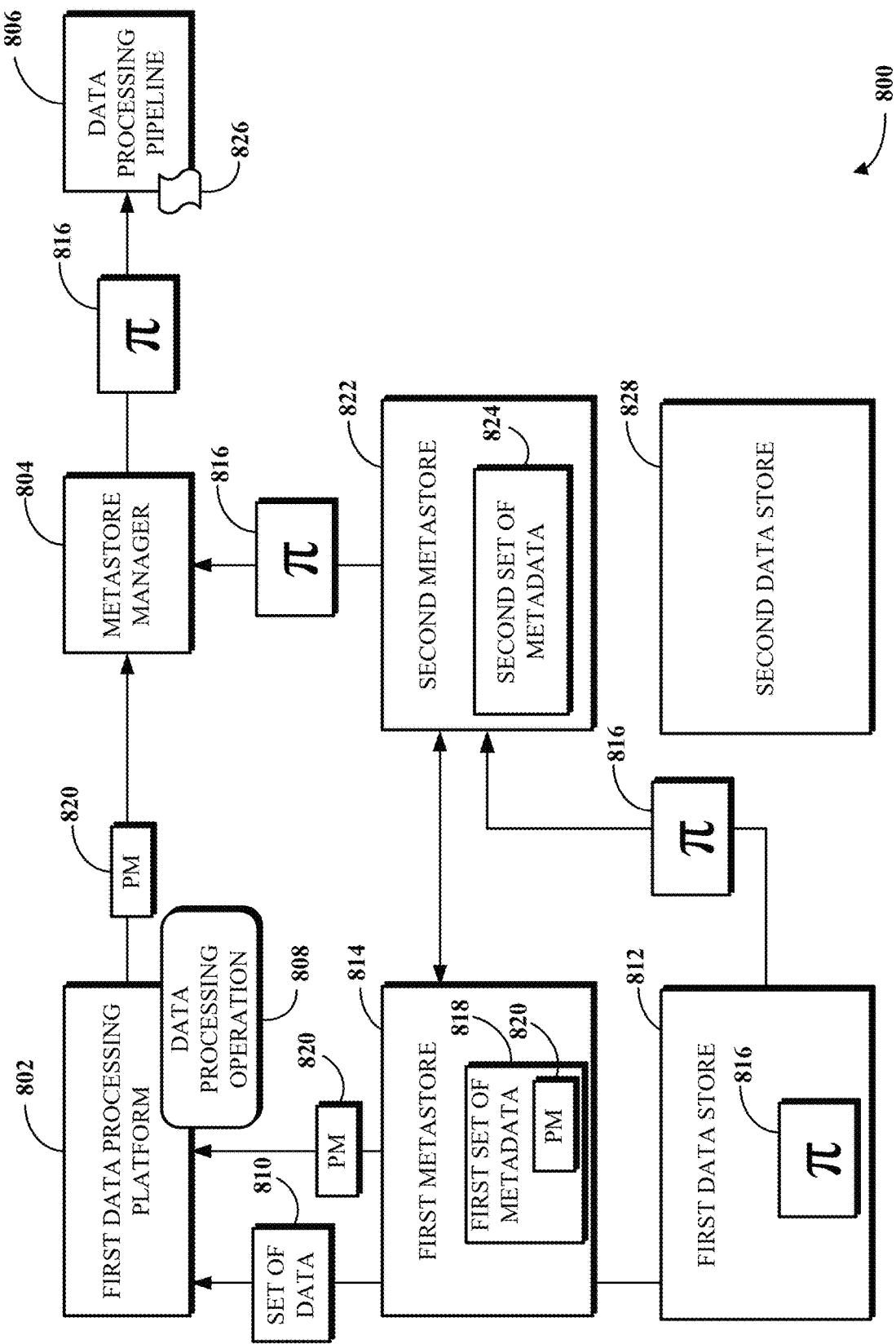
FIG. 8 is a schematic block diagram illustrating an example of an implementation of a multi-platform data management environment in accordance with the present disclosure.

FIG. 8 is a schematic block diagram illustrating an example 800 of an implementation of a multi-platform data management environment in accordance with the present disclosure. The example 800 includes a first data processing platform 802, a metastore manager 804, and a data processing pipeline 806. As shown, the first data processing platform 802 may perform a data processing operation 808 in association with a set 810 of data maintained in a first data store 812 associated with the first data processing platform 802. The first data processing platform 802 and the first data store 812 may be associated with a first data management platform (e.g., the first data management platform 602 depicted in FIG. 6). The first data processing platform 802 may obtain the set 810 of data from the first data store 812 via a first metastore 814. The first data processing platform 802 may generate, by performing the data processing operation 808, a set 816 of processed data (shown as "x" in FIG. 8).

The first data processing platform 802 may store the set 816 of processed data in the first data store 812. The first data processing platform 802 may store a first set 818 of metadata corresponding to the set 816 of processed data in the first metastore 814. The first set 818 of metadata may include partition metadata 820 indicative of partitioning information associated with the set 816 of processed data. The metastore manager 804 may store, in a second metastore 822 associated with the second data management platform, a second set 824 of metadata corresponding to a subset of the first set 818 of metadata. The second set 824 of metadata may exclude the partition metadata 820. The metastore manager 804 may cause the data processing pipeline 806 to execute a refresh component 826 to obtain the partition metadata 820. For example, the data processing pipeline 806 may execute the refresh component 826, causing the first metastore 814 (e.g., via the first data processing platform 802) to provide the partition metadata 820 to the data processing pipeline 806. The metastore manager 804 may obtain, in association with the partition metadata 820, the set 816 of processed data using the data processing pipeline 806.

The data processing pipeline 806 may be communicatively coupled, via a platform interface, with the second data management platform. The second data management platform may include a second data store 828 associated with the second metastore 822. The data processing pipeline 806 may not, in some implementations, be communicatively coupled with the first data management platform. The data processing operation 808 may include a SQL query on a distributed database associated with at least one of the first data store 812 or the second data store 828. The metastore manager 804 may obtain a directed acyclic graph (DAG) corresponding to the data processing operation 808 and may configure the data processing operation 808 in association with the DAG. The metastore manager 804 may configure the data processing operation 808 at least in part by allocating a set of computational resources for the data processing operation 808. The data processing pipeline 806 may perform an additional data processing operation in association with the set 816 of processed data.

The data processing pipeline 806 may include an artificial intelligence (AI) pipeline such as, for example, a machine learning pipeline. The AI pipeline may be used to generate content, predict events, make decisions, and/or otherwise process information. In some examples, the AI pipeline may take customer data, communication data, and/or environmental data as input. Customer data may include any number of different types of data associated with customers of the entity that is using the data processing pipeline 806. Data associated with a customer may include, for example, an account number, a name, an address, an email address, demographic information, a phone number, an internet protocol (IP) address, a customer preference, an attribute of a service and/or a product that the customer has paid for, among other examples. Communication data may include any number of different types of data associated with communications that have occurred (e.g., involving customers). Data associated with a communication may include, for example, device identifiers, domain names, quality of service (QOS) requirements, QoS rules, identifications of communications types (e.g., audio, video, workspace sharing), identifications of communication quality, identifications of communication media (e.g., wired networks, wireless networks), identifications of communication protocols, attributes associated with communication devices, network traffic information, and/or communication durations, among other examples. Environmental data may include any number of different types of contextual data associated with customers and/or communications. Contextual data associated with customers and/or communications may include market information, societal information, local information associated with a communication device (e.g., activation times, use durations, temperatures, device capabilities, and/or software versions among other examples.

In some cases, rather than including a refresh component in the data processing pipeline to facilitate obtaining data generated by a first data processing operation, a data processing operation that is configured in association with the first data management platform may be submitted to the second data management platform to be performed, so that the resulting output is stored by the second data management platform.

Figure 9:
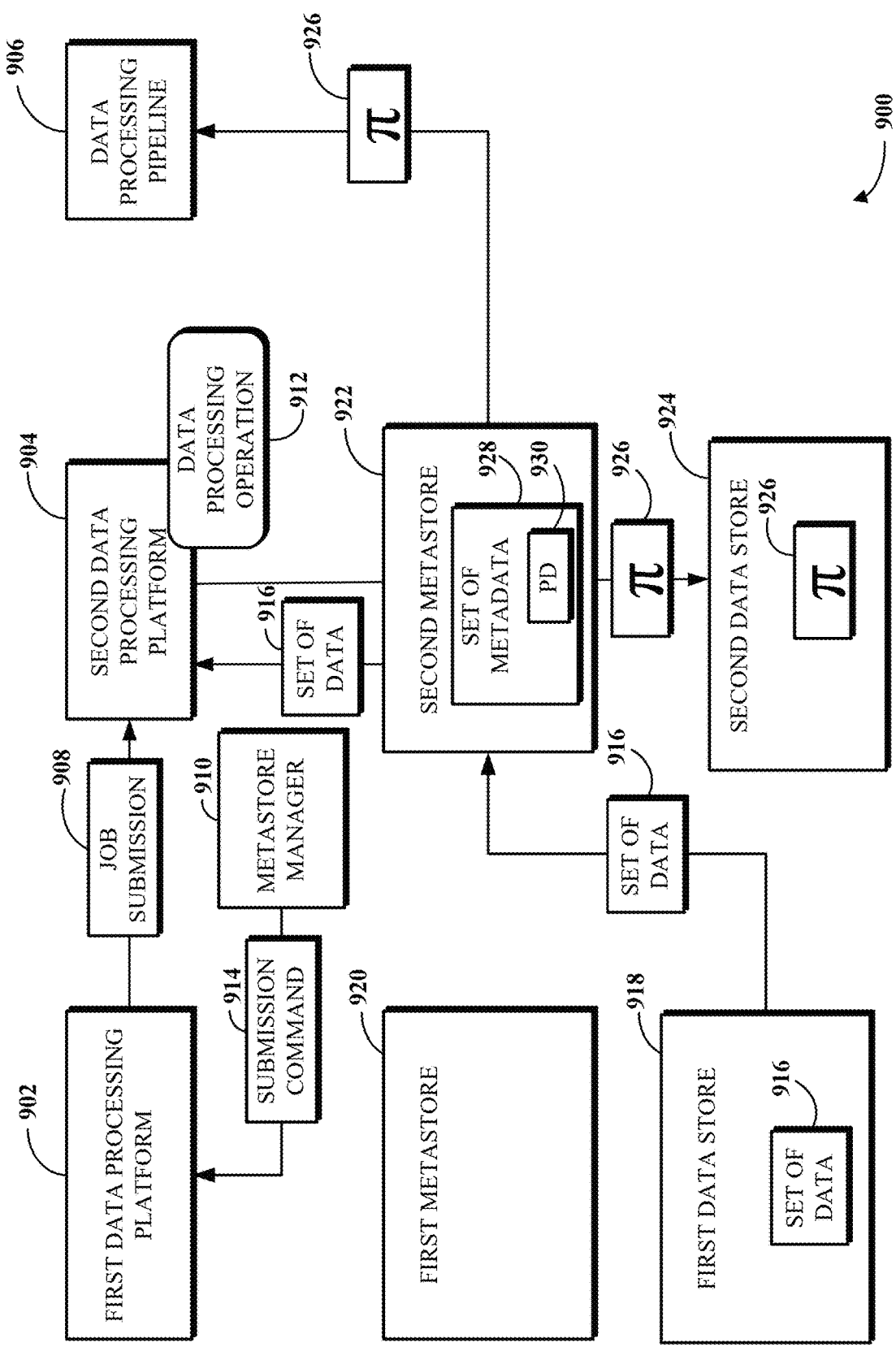
FIG. 9 is a schematic block diagram illustrating another example of an implementation of a multi-platform data management environment in accordance with the present disclosure.

FIG. 9 is a schematic block diagram illustrating another example 900 of an implementation of a multi-platform data management environment in accordance with the present disclosure. The example 900 includes a first data processing platform 902, a second data processing platform 904, and a data processing pipeline 906. The first data processing platform 902 may be associated with a first data management platform (e.g., the data management platform 704 shown in FIG. 7 or the first data management platform 602 shown in FIG. 6) and the second data processing platform 904 may be associated with a second data management platform (e.g., the data management platform 706 or 708 shown in FIG. 7 or the second data management platform 604 shown in FIG. 6). As shown, the first data processing platform 902 may provide a job submission 908 to the second data processing platform 904. In some examples, the job submission 908 may be provided directly to the second data processing platform 904. In some other examples, the job submission 908 may be provided to the second data processing platform 904 via a metastore manager 910. For example, the first data processing platform 902 may cause the metastore manager 910 to provide the job submission 908 to the second data processing platform 904. The job submission 908 may be or include a script that can be executed to perform a data processing operation 912, a function call to initiate the data processing operation 912, an entity that describes the data processing operation 912, and/or a command configured to cause execution of the data processing operation 912. In some examples, the metastore manager 910 may provide a submission command 914 to the first data processing platform 902 to cause the first data processing platform 902 to provide the job submission 908 to the second data processing platform 904.

The second data processing platform 904 may perform the data processing operation 912 in association with a set 916 of data maintained in a first data store 918 associated with the first data processing platform 902. The first data store 918 may be associated with the first data management platform. The second data processing platform 904 may obtain the set 916 of data from the first data store 918 via a first metastore 920 associated with the first data store 918. The second data processing platform 904 may obtain the set 916 of data from the first data store 918 via a second metastore 922. The second metastore 922 may be associated with the second data processing platform 904 and a second data store 924. The second metastore 922 and the second data store 924 may be associated with the second data management platform. The second data processing platform 904 may generate, by performing the data processing operation 912, a set 926 of processed data (shown as "x" in FIG. 9). The data processing operation 912 may include a SQL query on a distributed database associated with the first data store 918. The second data processing platform 904 may store the set 926 of processed data in the second data store 924. The second data processing platform 904 may store a set 928 of metadata corresponding to the set 926 of processed data in the second metastore 922. The set 928 of metadata may include partition metadata 930 indicative of partitioning information associated with the set 926 of processed data. The data processing pipeline 906 may be communicatively coupled, via a platform interface, with the second data management platform. For example, the data processing pipeline 906 may be communicatively coupled with the second metastore 922. The data processing pipeline 906 may perform an additional data processing operation in association with the set 926 of processed data.

Figure 10:
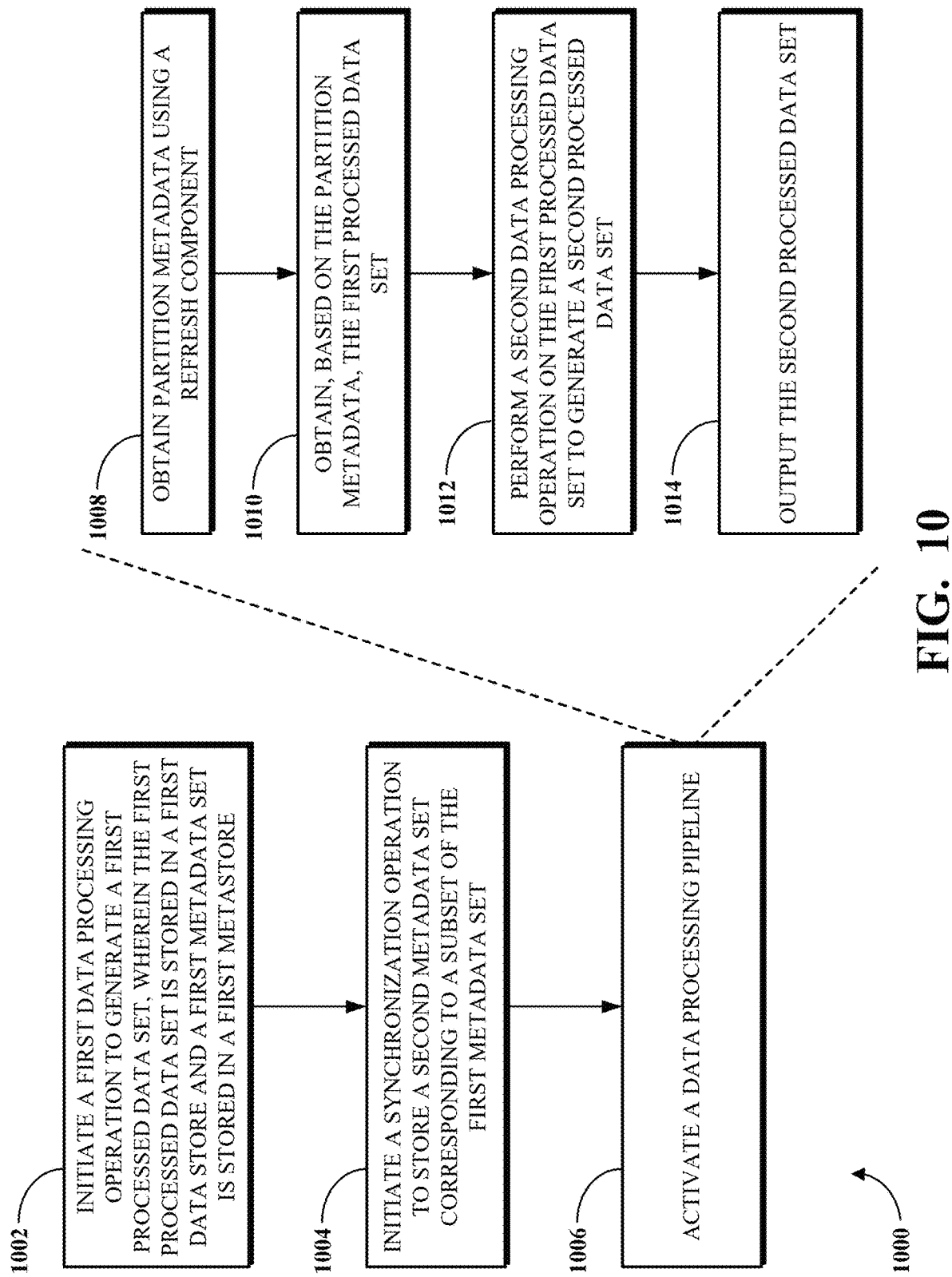
FIG. 10 is a flowchart of an example of a technique for performing a multi-platform data operation.

To further describe some implementations in greater detail, reference is next made to examples of techniques which may be performed by or using a system for performing multi-platform data operations. FIG. 10 is a flowchart of an example of a technique 1000 for performing a multi-platform data operation. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations of the technique 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The step 1002 includes initiating, in association with a data set maintained in a first data store associated with a first data management platform, a first data processing operation to generate a first processed data set. The first processed data set is stored in the first data store and a first metadata set corresponding to the first processed data set is stored in a first metastore associated with the first data store. The first metadata set includes partition metadata indicative of partitioning information associated with the first processed data set. The step 1004 includes initiating a synchronization operation to store, in a second metastore associated with a second data management platform, a second metadata set corresponding to a subset of the first metadata set. The step 1006 includes activating a data processing pipeline. The data processing pipeline may be configured to perform one or more of a number of steps such as, for example, one or more of steps 1008, 1010, 1012, and 1014.

The step 1008 includes obtaining the partition metadata using a refresh component. The step 1010 includes obtaining, based on the partition metadata, the first processed data set. The step 1012 includes performing a second data processing operation on the first processed data set to generate a second processed data set. The step 1014 includes outputting the second processed data set. The data processing pipeline may be communicatively coupled, via a platform interface, with the second data management platform. In some examples, the data processing pipeline may be communicatively coupled, via a platform interface, with only the second data management platform. The first data processing operation may include an SQL query on a distributed database associated with at least one of the first data store or a second data store associated with the second metastore. In some examples, the method may include obtaining a DAG corresponding to the first data processing operation and configuring the first data processing operation in association with the DAG. For example, configuring the first data processing operation may include configuring the first data processing operation at least in part by allocating a set of computational resources for the first data processing operation. The second processed data set may include an output of an AI operation. The data processing pipeline, to output the second processed data set, may be configured to output the second processed data set to a UCaaS platform.

Some implementations include a method, comprising: initiating, in association with a data set maintained in a first data store associated with a first data management platform, a first data processing operation to generate a first processed data set, wherein the first processed data set is stored in the first data store, and wherein a first metadata set corresponding to the first processed data set is stored in a first metastore associated with the first data store, the first metadata set comprising partition metadata indicative of partitioning information associated with the first processed data set; initiating a synchronization operation to store, in a second metastore associated with a second data management platform, a second metadata set corresponding to a subset of the first metadata set; and activating a data processing pipeline configured to: obtain the partition metadata using a refresh component; obtain, based on the partition metadata, the first processed data set; perform a second data processing operation on the first processed data set to generate a second processed data set; and output the second processed data set.

In some implementations, the data processing pipeline is communicatively coupled, via a platform interface, with the second data management platform.

In some implementations, the data processing pipeline is communicatively coupled, via a platform interface, with only the second data management platform.

In some implementations, the first data processing operation comprises an SQL query on a distributed database associated with at least one of the first data store or a second data store associated with the second metastore.

In some implementations, the method further comprises: obtaining a DAG corresponding to the first data processing operation; and configuring the first data processing operation in association with the DAG.

In some implementations, the method further comprises: configuring the first data processing operation at least in part by allocating a set of computational resources for the first data processing operation.

In some implementations, the second processed data set comprises an output of an AI operation.

In some implementations, to output the second processed data set, the data processing pipeline is configured to output the second processed data set to a UCaaS platform.

Some implementations include a non-transitory computer-readable medium storing instructions operable to cause one or more processors to perform operations comprising: initiating, in association with a data set maintained in a first data store associated with a first data management platform, a first data processing operation to generate a first processed data set, wherein the first processed data set is stored in the first data store, and wherein a first metadata set corresponding to the first processed data set is stored in a first metastore associated with the first data store, the first metadata set comprising partition metadata indicative of partitioning information associated with the first processed data set; initiating a synchronization operation to store, in a second metastore associated with a second data management platform, a second metadata set corresponding to a subset of the first metadata set; and activating a data processing pipeline configured to: obtain the partition metadata using a refresh component; obtain, based on the partition metadata, the first processed data set; perform a second data processing operation on the first processed data set to generate a second processed data set; and output the second processed data set.

In some implementations, the data processing pipeline is configured to obtain the first processed data set via a platform interface that connects the data processing pipeline with only the second data management platform.

In some implementations, the first data processing operation comprises an SQL query on a distributed database associated with at least one of the first data store or a second data store associated with the second metastore.

In some implementations, the operations further comprising allocating a set of computational resources for the first data processing operation.

In some implementations, the data processing pipeline comprises an AI pipeline.

Some implementations include a system, comprising: one or more memories; and one or more processors configured to execute instructions stored in the one or more memories to: initiate, in association with a data set maintained in a first data store associated with a first data management platform, a first data processing operation to generate a first processed data set, wherein the first processed data set is stored in the first data store, and wherein a first metadata set corresponding to the first processed data set is stored in a first metastore associated with the first data store, the first metadata set comprising partition metadata indicative of partitioning information associated with the first processed data set; initiate a synchronization operation to store, in a second metastore associated with a second data management platform, a second metadata set corresponding to a subset of the first metadata set; and activate a data processing pipeline configured to: obtain the partition metadata using a refresh component; obtain, based on the partition metadata, the first processed data set; perform a second data processing operation on the first processed data set to generate a second processed data set; and output the second processed data set.

In some implementations, the system further comprises a platform interface that communicatively couples the data processing pipeline with the second data management platform.

In some implementations, the system further comprises a platform interface that communicatively couples the data processing pipeline with only the second data management platform.

In some implementations, the system further comprises a platform interface that communicatively couples the first data management platform with the second data management platform.

In some implementations, the system further comprises a platform interface that communicatively couples the data processing pipeline with a UCaaS platform.

In some implementations, the second data management platform comprises a metastore manager configured to manage access, by the data processing pipeline, to the first data store.

In some implementations, the second data processing operation comprises an AI operation.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

communicating a request, from a driver node to a metastore manager, for initiating, in association with a data set maintained in a first data store associated with a first data management platform, a first data processing operation, to be performed by the first data management platform, to generate a first processed data set, wherein the first processed data set is stored in the first data store, and wherein a first metadata set corresponding to the first processed data set is stored in a first metastore associated with the first data store, the first metadata set comprising partition metadata indicative of partitioning information associated with the first processed data set, wherein the metastore manager is configured to:

obtain a directed acyclic graph (DAG) corresponding to the first data processing operation; and configure the first data processing operation in association with the DAG, wherein the DAG includes an unresolved logical plan, a logical plan, and an optimized logical plan;

initiating, by the metastore manager, a synchronization operation to store, in a second metastore associated with a second data management platform, a second metadata set corresponding to a subset of the first metadata set; and activating, by the metastore manager, a data processing pipeline that is not communicatively coupled with the first data management platform wherein the data processing pipeline includes an artificial intelligence (AI) pipeline, to cause the data processing pipeline to obtain the partition metadata using a refresh component, and wherein the data processing pipeline is configured to:

obtain, based on the partition metadata, the first processed data set;

perform a second data processing operation on the first processed data set to generate a second processed data set, wherein the second processed data set comprises an output of an AI operation; and output the second processed data set to a unified communications as a service (UCaaS) platform.

2. The method of claim 1, wherein the data processing pipeline is communicatively coupled, via a platform interface, with the second data management platform.

3. The method of claim 1, wherein the data processing pipeline is communicatively coupled, via a platform interface, with only the second data management platform.

4. The method of claim 1, wherein the first data processing operation comprises a structured query language (SQL) query on a distributed database associated with at least one of the first data store or a second data store associated with the second metastore.

5. The method of claim 1, further comprising configuring the first data processing operation at least in part by allocating a set of computational resources for the first data processing operation.

6. A non-transitory computer-readable medium storing instructions operable to cause one or more processors to perform operations comprising:

communicating a request, from a driver node to a metastore manager, for initiating, in association with a data set maintained in a first data store associated with a first data management platform, a first data processing operation, to be performed by the first data management platform, to generate a first processed data set, wherein the first processed data set is stored in the first data store, and wherein a first metadata set corresponding to the first processed data set is stored in a first metastore associated with the first data store, the first metadata set comprising partition metadata indicative of partitioning information associated with the first processed data set, wherein the metastore manager is configured to:

obtain a directed acyclic graph (DAG) corresponding to the first data processing operation; and configure the first data processing operation in association with the DAG, wherein the DAG includes an unresolved logical plan, a logical plan, and an optimized logical plan;

initiating, by the metastore manager, a synchronization operation to store, in a second metastore associated with a second data management platform, a second metadata set corresponding to a subset of the first metadata set; and activating, by the metastore manager, a data processing pipeline that is not communicatively coupled with the first data management platform wherein the data processing pipeline includes an artificial intelligence (AI) pipeline, to cause the data processing pipeline to:

obtain the partition metadata using a refresh component, and wherein the data processing pipeline is configured to:

obtain, based on the partition metadata, the first processed data set;

perform a second data processing operation on the first processed data set to generate a second processed data set, wherein the second processed data set comprises an output of an AI operation; and output the second processed data set to a unified communications as a service (UCaaS) platform.

7. The non-transitory computer-readable medium of claim 6, wherein the data processing pipeline is configured to obtain the first processed data set via a platform interface that connects the data processing pipeline with only the second data management platform.

8. The non-transitory computer-readable medium of claim 6, wherein the first data processing operation comprises a structured query language (SQL) query on a distributed database associated with at least one of the first data store or a second data store associated with the second metastore.

9. The non-transitory computer-readable medium of claim 6, the operations further comprising allocating a set of computational resources for the first data processing operation.

10. A system, comprising:

one or more memories; and one or more processors configured to execute instructions stored in the one or more memories to:

communicating a request, from a driver node to a metastore manager, for initiating, in association with a data set maintained in a first data store associated with a first data management platform, a first data processing operation, to be performed by the first data management platform, to generate a first processed data set, wherein the first processed data set is stored in the first data store, and wherein a first metadata set corresponding to the first processed data set is stored in a first metastore associated with the first data store, the first metadata set comprising partition metadata indicative of partitioning information associated with the first processed data set, wherein the metastore manager is configured to:

obtain a directed acyclic graph (DAG) corresponding to the first data processing operation; and configure the first data processing operation in association with the DAG, wherein the DAG includes an unresolved logical plan, a logical plan, and an optimized logical plan;

initiate, by the metastore manager, a synchronization operation to store, in a second metastore associated with a second data management platform, a second metadata set corresponding to a subset of the first metadata set; and activate, by the metastore manager, a data processing pipeline that is not communicatively coupled with the first data management platform wherein the data processing pipeline includes an artificial intelligence (AI) pipeline, to cause the data processing pipeline to obtain the partition metadata using a refresh component, and wherein the data processing pipeline is configured to:

obtain, based on the partition metadata, the first processed data set;

perform a second data processing operation on the first processed data set to generate a second processed data set, wherein the second processed data set comprises an output of an AI operation; and output the second processed data set to a unified communications as a service (UCaaS) platform.

11. The system of claim 10, further comprising a platform interface that communicatively couples the data processing pipeline with the second data management platform.

12. The system of claim 10, further comprising a platform interface that communicatively couples the data processing pipeline with only the second data management platform.

13. The system of claim 10, further comprising a platform interface that communicatively couples the first data management platform with the second data management platform.

14. The system of claim 10, further comprising a platform interface that communicatively couples the data processing pipeline with a unified communications as a service (UCaaS) platform.

15. The system of claim 10, wherein the second data management platform comprises a metastore manager configured to manage access, by the data processing pipeline, to the first data store.

* * * * *